United States Patent
Martini et al.

(10) Patent No.: US 10,493,671 B2
(45) Date of Patent: Dec. 3, 2019

(54) APPARATUS AND METHOD FOR FORMING OPENING DEVICES ON A SHEET PACKAGING MATERIAL FOR PACKAGING POURABLE FOOD PRODUCTS

(71) Applicant: Tetra Laval Holdings & Finance S.A., Pully (CH)

(72) Inventors: Pietro Martini, Parma (IT); Paolo Benedetti, Modena (IT); Paolo Fontanazzi, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 236 days.

(21) Appl. No.: 15/109,201

(22) PCT Filed: Nov. 25, 2014

(86) PCT No.: PCT/EP2014/075451
§ 371 (c)(1),
(2) Date: Jun. 30, 2016

(87) PCT Pub. No.: WO2015/101443
PCT Pub. Date: Jul. 9, 2015

(65) Prior Publication Data
US 2016/0325471 A1    Nov. 10, 2016

(30) Foreign Application Priority Data

Dec. 31, 2013    (EP) .................................... 13199871

(51) Int. Cl.
*B29C 43/18*    (2006.01)
*B29C 31/04*    (2006.01)
(Continued)

(52) U.S. Cl.
CPC ............. *B29C 43/18* (2013.01); *B29C 31/048* (2013.01); *B29C 43/34* (2013.01); *B29C 43/36* (2013.01);
(Continued)

(58) Field of Classification Search
CPC ....... B29C 43/18; B29C 43/36; B29C 31/048; B29C 43/34; B29C 2043/3483;
(Continued)

(56) References Cited

U.S. PATENT DOCUMENTS 2,131,319 A  *  9/1938  Greenholtz ............. B29C 45/14
                                                    215/329
3,557,404 A  *  1/1971  Zippel et al. ........... B29C 33/00
                                                    425/200
(Continued)

FOREIGN PATENT DOCUMENTS

| EP | 2 008 787 A1 | 12/2008 |
| EP | 2 361 743 A1 | 8/2011 |
| RU | 2 196 046 C2 | 1/2003 |

OTHER PUBLICATIONS

International Search Report (PCT/ISA/210) dated Mar. 20, 2015, by the European Patent Office as the International Searching Authority for International Application No. PCT/EP2014/075451.
(Continued)

*Primary Examiner* — Leith S Shafi
(74) *Attorney, Agent, or Firm* — Buchanan Ingersoll & Rooney PC

(57) ABSTRACT

An apparatus for forming an opening device on a receiving portion of a sheet packaging material for packaging pourable food products comprises a molding unit having a first and a second mold selectively set in an open configuration, in which they are spaced from one another to allow feed of the packaging material therebetween, and in a closed configu-
(Continued)

ration, in which they cooperate with faces of the packaging material and delimit a closed mold cavity housing the receiving portion of the packaging material and adapted to be filled with molten plastic material to define, when the plastic material sets, the opening device. The apparatus further comprises feeding device to feed molten plastic material to the molding zone in the open configuration of the first and second mold, and pressing device exerting pressure on the dose to force it to fill the mold cavity and to form the opening device.

4 Claims, 7 Drawing Sheets

(51) Int. Cl.
    *B29C 43/34*     (2006.01)
    *B29C 43/36*     (2006.01)
    *B29L 31/56*     (2006.01)
    *B29L 31/00*     (2006.01)
    *B29K 105/00*     (2006.01)
    *B29K 623/00*     (2006.01)

(52) U.S. Cl.
    CPC ............ *B29C 2043/3444* (2013.01); *B29C 2043/3483* (2013.01); *B29K 2105/0067* (2013.01); *B29K 2623/06* (2013.01); *B29K 2623/12* (2013.01); *B29L 2031/565* (2013.01); *B29L 2031/7166* (2013.01)

(58) Field of Classification Search
    CPC . B29C 2043/3444; B29C 43/22; B29C 43/28; B29C 43/44; B29C 43/04; B29C 2043/046; B29C 33/36; B29C 2043/483; B29C 43/08; B29C 43/06; B29C 43/00; B29C 43/30; B29C 43/305; B29C 2043/3283; B29C 2043/3422; B29C 44/60; B29K 2623/06; B29K 2105/0067; B29K 2623/12; B29L 2031/7166; B29L 2031/565; B30B 5/06; B30B 5/062; B30B 3/00; B30B 3/04; B30B 3/045; B30B 3/06; B30B 11/14; B21K 1/44; B21K 1/54; B21K 1/58; B21K 23/02
    USPC ................ 425/253, 364 R, 371, 347, 345
    See application file for complete search history.

(56) References Cited

U.S. PATENT DOCUMENTS

| | | | | |
|---|---|---|---|---|
| 4,327,052 | A | * | 4/1982 | Sauer .................. B29C 49/12 264/512 |
| 4,735,753 | A | * | 4/1988 | Ackermann ........... A41H 37/04 156/580.1 |
| 6,146,563 | A | | 11/2000 | Holland et al. |
| 2002/0028270 | A1 | * | 3/2002 | Gustafsson ....... B29C 45/14344 426/115 |
| 2011/0018166 | A1 | * | 1/2011 | Pucci .................... B29C 31/008 264/266 |
| 2012/0257844 | A1 | | 10/2012 | Andersson |
| 2012/0273996 | A1 | | 11/2012 | Martini et al. |
| 2013/0216638 | A1 | * | 8/2013 | Garceau ................. B29C 43/06 425/145 |
| 2013/0273214 | A1 | | 10/2013 | Martini et al. |
| 2016/0318217 | A1 | | 11/2016 | Borghi |

OTHER PUBLICATIONS

Office Action (Decision to Grant) dated May 17, 2018, by the Federal Service for Intellectual Property in corresponding Russian Patent Application No. 2016119370/05(030494), and an English Translation of the Office Action. (16 pages).

* cited by examiner

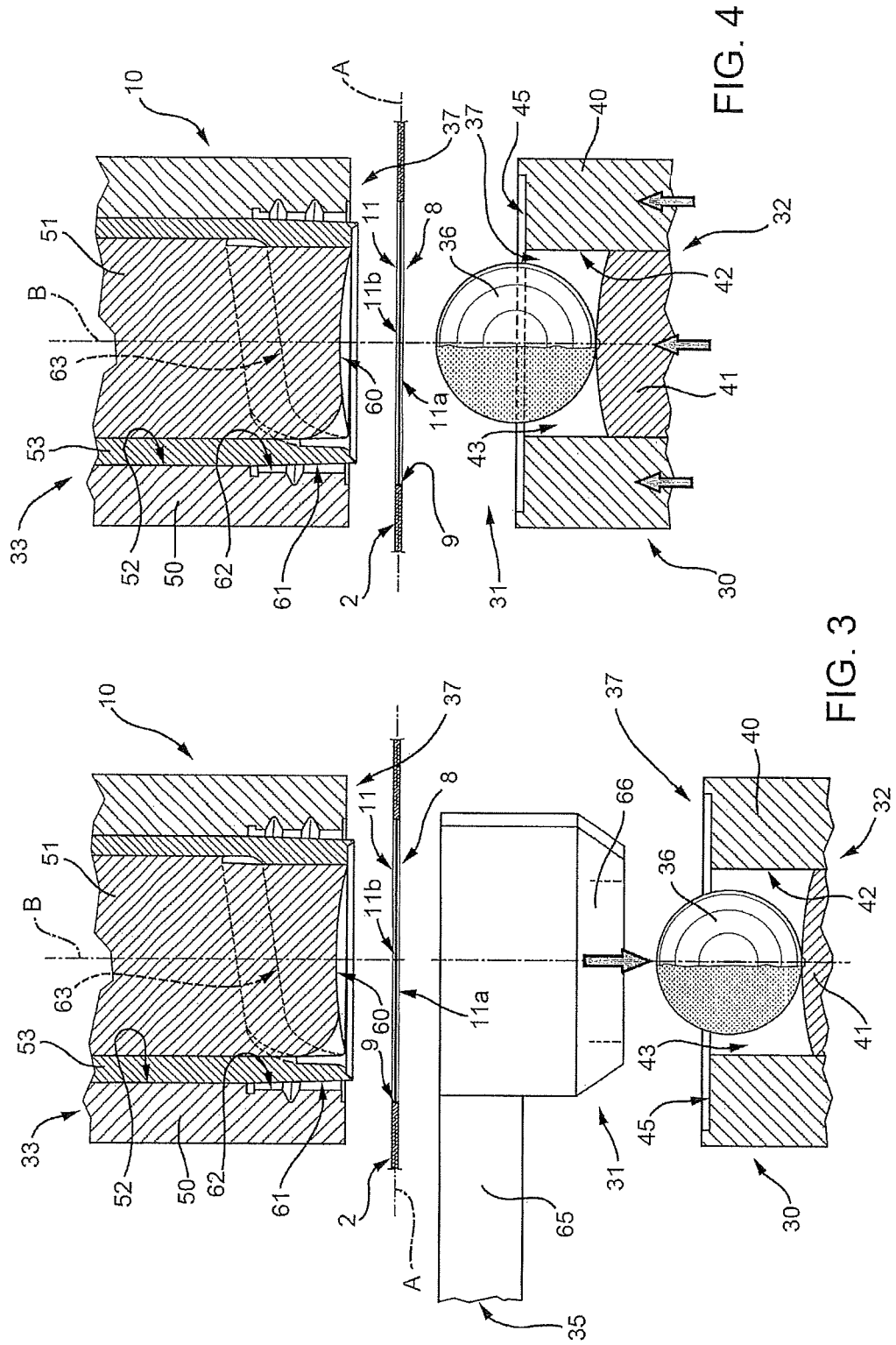

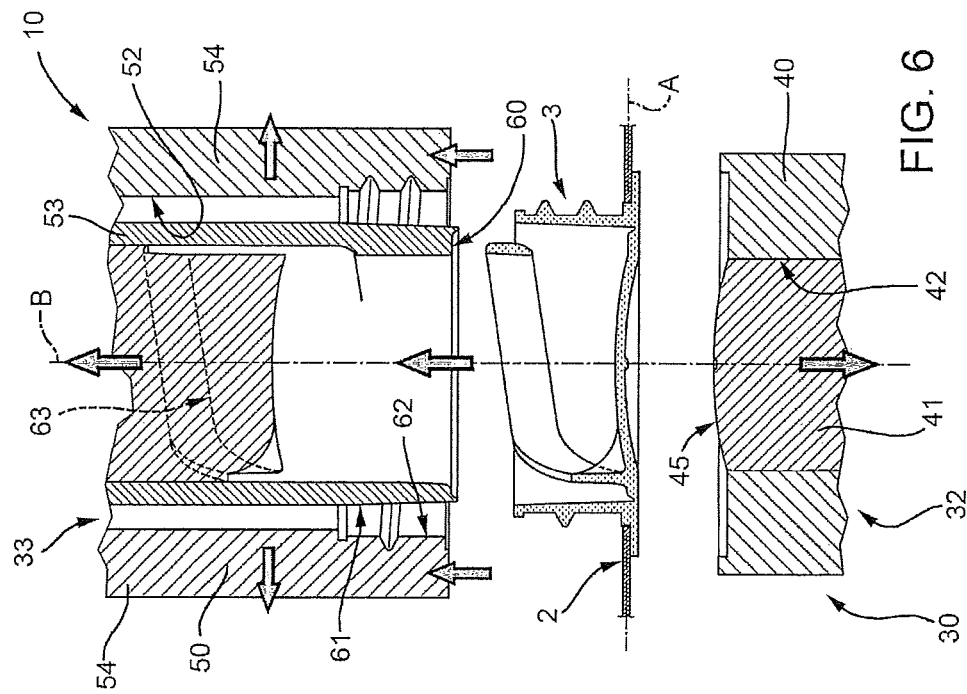
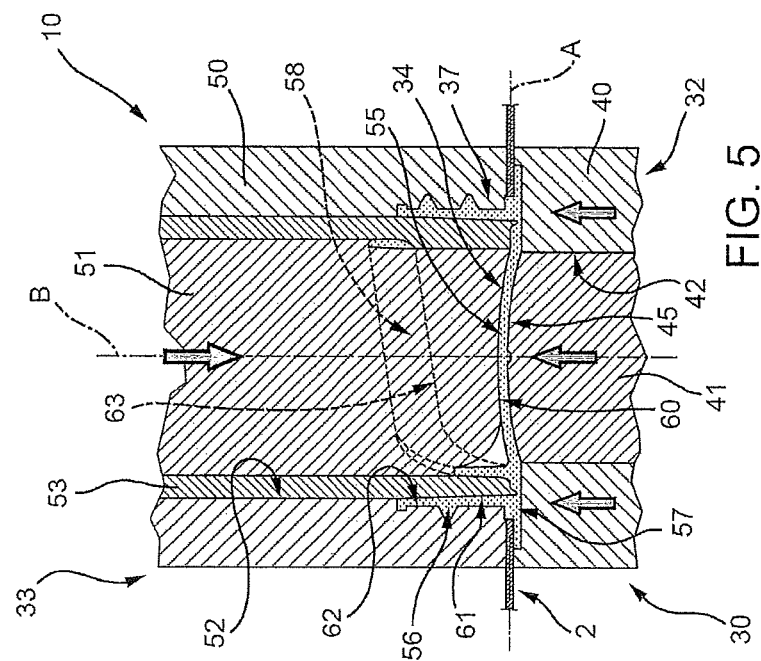

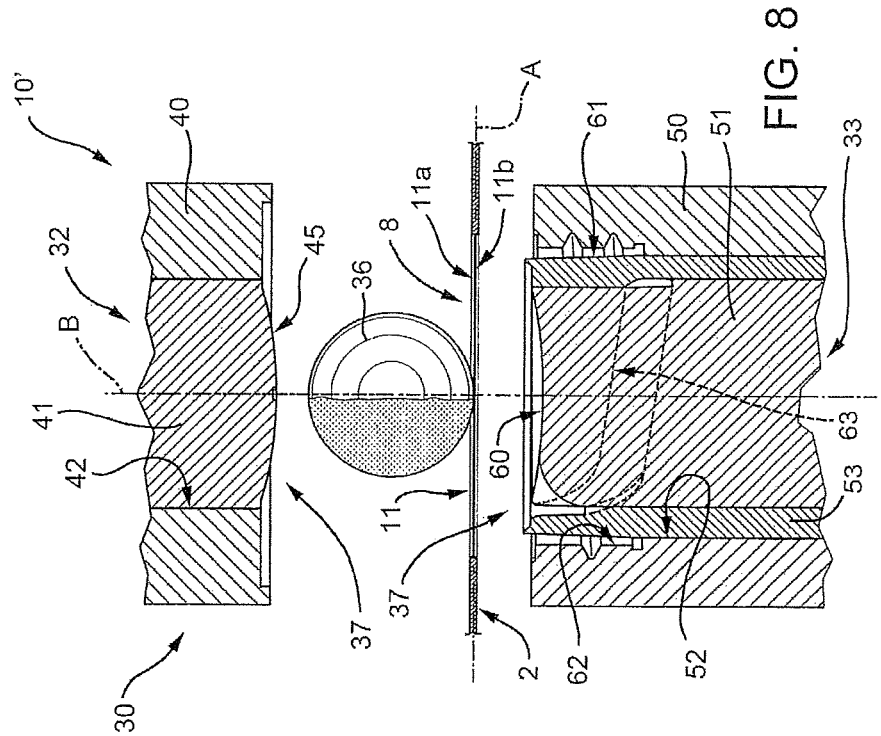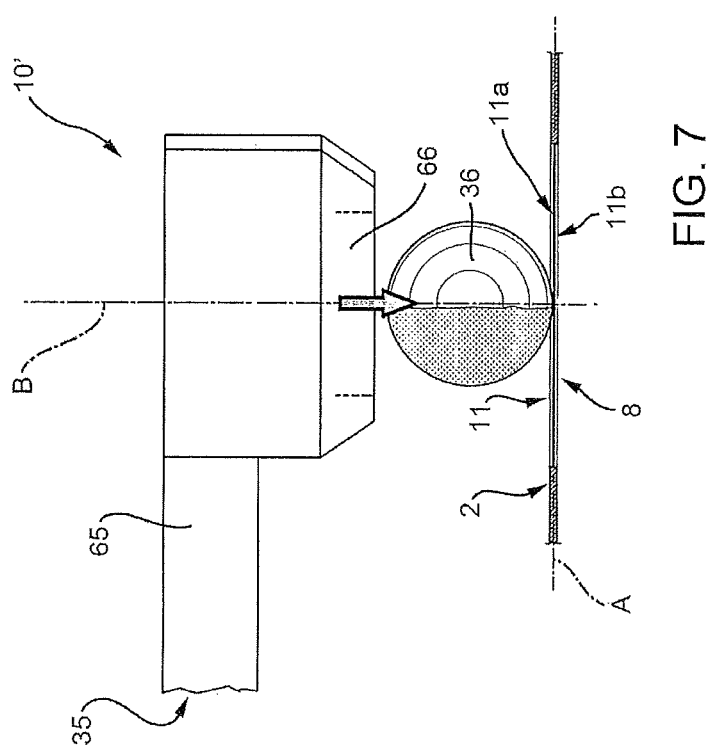

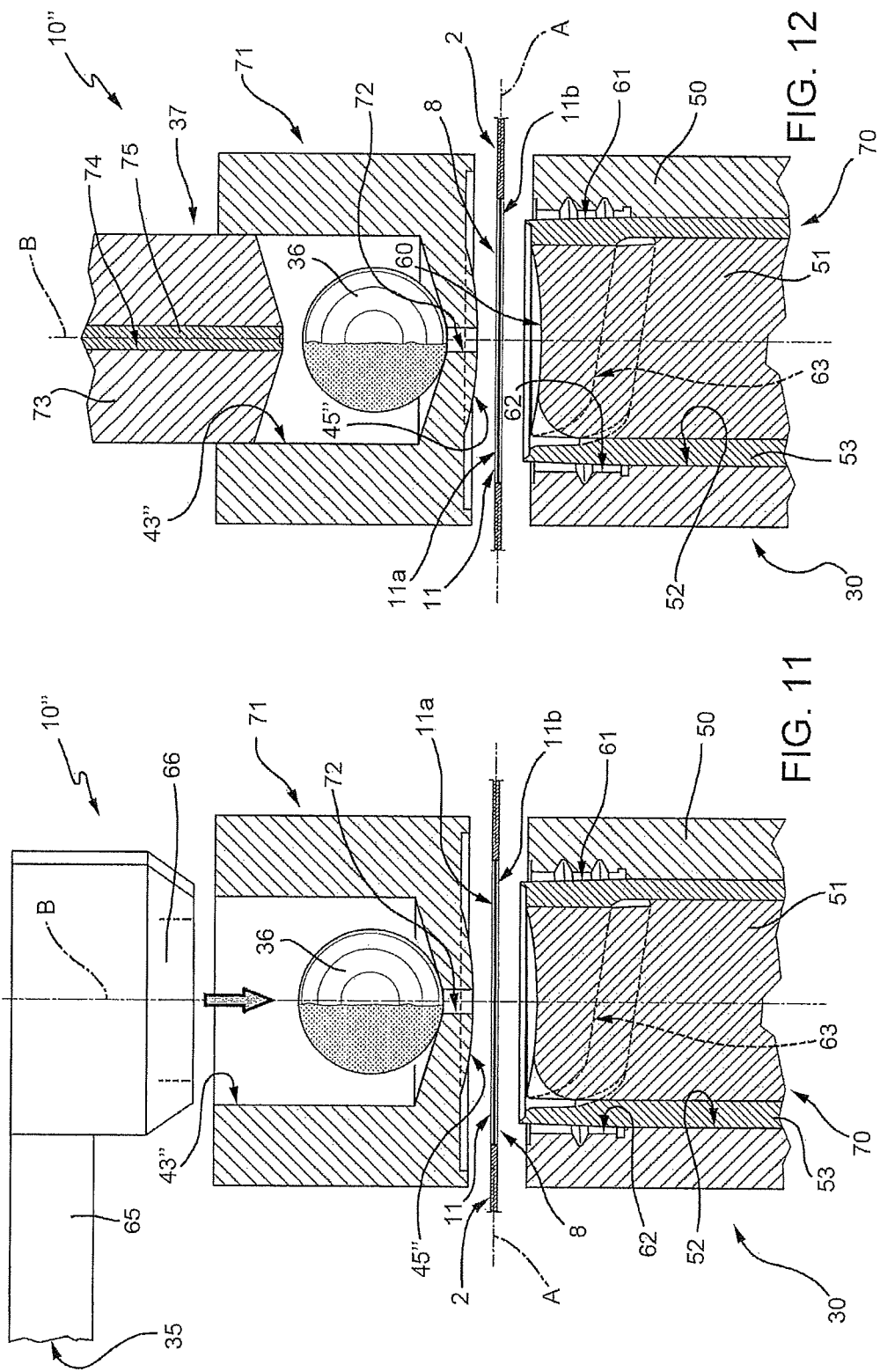

APPARATUS AND METHOD FOR FORMING OPENING DEVICES ON A SHEET PACKAGING MATERIAL FOR PACKAGING POURABLE FOOD PRODUCTS

TECHNICAL FIELD

The present invention relates to an apparatus and a method for forming opening devices on a sheet packaging material for packaging pourable food products.

BACKGROUND OF INVENTION

As known, many pourable food products, such as fruit juice, UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material, and a number of lamination layers of heat-seal plastic material, e.g. polyethylene films, covering both sides of the base layer.

In the case of aseptic packages for long-storage products, such as UHT milk, the packaging material also comprises a layer of gas-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

Packages of this sort are normally produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; the web of packaging material so sterilized is then maintained in a closed, sterile environment, and is folded and sealed longitudinally to form a vertical tube.

The tube is filled with the sterilized or sterile-processed food product, and is sealed and subsequently cut along equally spaced cross sections to form pillow packs, which are then folded mechanically to form respective finished, e.g. substantially parallelepiped-shaped, packages.

Alternatively, the packaging material may be cut into blanks, which are formed into packages on forming spindles, and the packages are filled with the food product and sealed. One example of this type of package is the so-called "gable-top" package known by the trade name Tetra Rex (registered trademark).

To open the packages described above, various solutions have been proposed, including reclosable opening devices made of plastic material and substantially comprising a pouring element, e.g. a spout, defining a through opening and fitted to a hole in a wall of the package.

When producing one type of opening device, the opening of the pouring element is sealed by a plastic confetti portion connected integrally to the pouring element and detachable from it along a smaller-section annular tearable membrane.

A removable, e.g. screw or hinged, cap can be fitted to the pouring element to outwardly close the latter and to allow closure of the package after the first opening by removing the confetti portion.

On the side destined to face the cap, the confetti portion may have an integral projecting pull ring, the free end of which is pulled by the user to detach the confetti portion from the pouring element along the tearable membrane and so open the product pour opening.

In the case of packages requiring not only liquid but also gas sealing, the opening devices are fitted to removable portions of the packaging material rather than to holes formed in the packaging material. In one such known solution, the confetti portion of the opening device is fixed directly to a pre-laminated hole in the packaging material, i.e. a hole formed in the base layer only and covered by the other lamination layers, including the layer of gas-barrier material.

The above-described opening devices can be produced and applied directly on the edges of the holes formed in the packaging material or on the above-described pre-laminated holes by injection molding operations.

In such method of applying opening devices, the packaging material is advanced along a given path and is stopped when one of its holes or pre-laminated holes is interposed between, and faces, two molds in an open configuration.

At this point, the molds are displaced towards the packaging material to reach a closed configuration, in which they cooperate with opposite faces of the packaging material and define a closed mold cavity housing the hole or the pre-laminated hole on which the opening device is to be formed. The injection molding operation is then performed by injecting the molten plastic material in the mold cavity defined by the molds in the closed configuration.

In the case of an opening device formed on a hole of the packaging material, the molten plastic material is injected into the mold cavity from one side thereof and is forced to flow within the mold cavity to fill it completely. When the molten plastic material sets, the molds are opened and the packaging material can be again advanced to take a new hole between the open molds for forming another opening device.

In the case of an opening device formed on a pre-laminated hole of the packaging material, the molten plastic material is injected onto one side of the pre-laminated hole to cover it up to an annular peripheral portion thereof and to form, in this way, a plastic confetti portion directly attached to the pre-laminated hole; the molten plastic material is then forced to pierce the pre-laminated hole at such annular peripheral portion to form a pouring element of the opening device projecting from an opposite side of the pre-laminated hole and attached to the confetti portion through a smaller-section annular membrane connection portion adapted to be torn by the user to open the package. In this way, the material forming the pre-laminated hole is first pierced through and then resealed by the plastic material forming the pouring element.

Injection molding apparatus and methods of the type described above are used widely and satisfactorily to form opening devices directly on a sheet packaging material. Within the industry, however, a demand for further improvements is felt, particularly in view of the continual request to increase the output rate of the packaging machines and to decrease the footprints thereof.

DISCLOSURE OF INVENTION

It is therefore an object of the present invention to provide an apparatus and a method for forming opening devices on a sheet packaging material for packaging pourable food products, which allow to satisfy the aforementioned demands typically associated with known apparatus and methods.

According to the present invention, there are provided an apparatus as claimed in claim 1 and a method as claimed in claim 9.

BRIEF DESCRIPTION OF THE DRAWINGS

Three preferred, non-limiting embodiments of the present invention will be described by way of example with reference to the accompanying drawings, in which:

FIGS. 3 to 6 show partial sections of the forming apparatus according to the present invention during successive steps of the relative forming method;

FIGS. 7 to 10 show partial sections of a different embodiment of a forming apparatus according to the present invention during successive steps of the relative forming method; and FIGS. 11 to 14 show partial sections of a further embodiment of a forming apparatus according to the present invention during successive steps of the relative forming method.

DETAILED DESCRIPTION OF PREFERRED EMBODIMENTS

Figure 1:
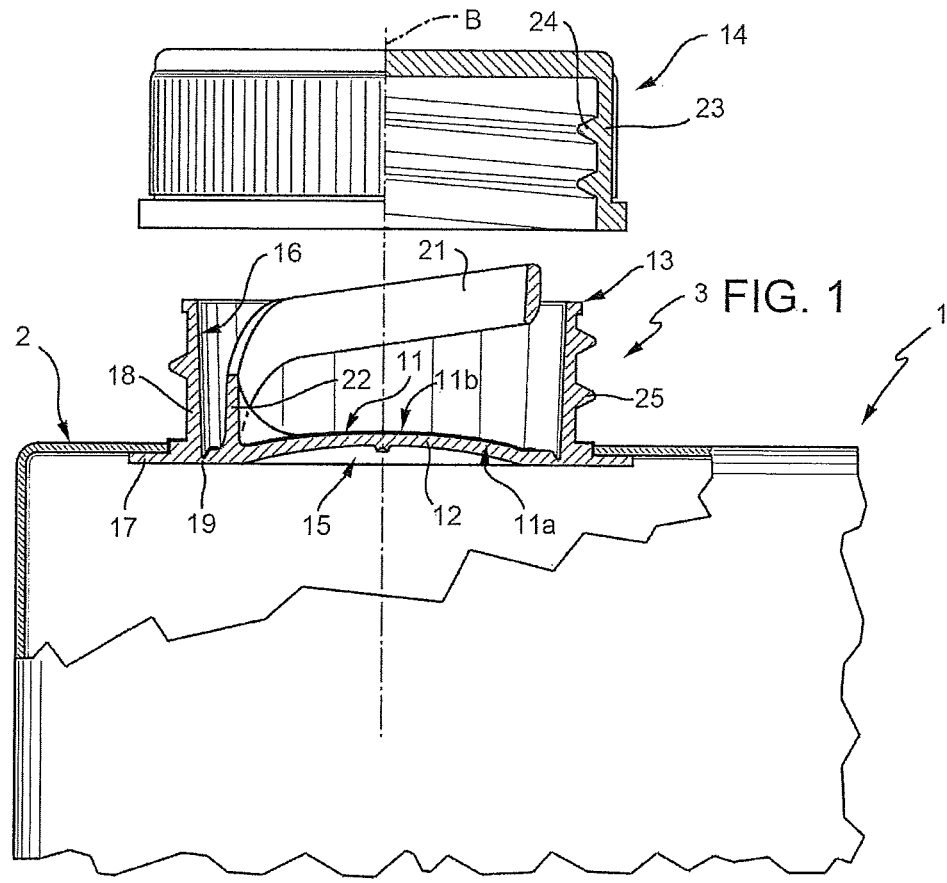
FIG. 1 shows a partly sectioned, exploded side view of a sealed package made of sheet material and on which an opening device is formed using the forming apparatus and method according to the present invention.

Number 1 in FIG. 1 indicates as a whole a sealed package for pourable food products, made of a multilayer sheet packaging material 2 which is folded and sealed in known manner as described in detail above, and to which an opening device 3 of plastic material is applied using a forming apparatus 10 (shown in FIGS. 3 to 6) according to the present invention.

In the example shown, package 1 is parallelepiped-shaped and of the type known by the trade name Tetra Brik Aseptic (registered trademark). Forming apparatus according to the present invention, however, also applies to advantage to packaging materials for other types of packages, such as the gable-top packages known by the trade name Tetra Rex (registered trademark).

Figure 2:
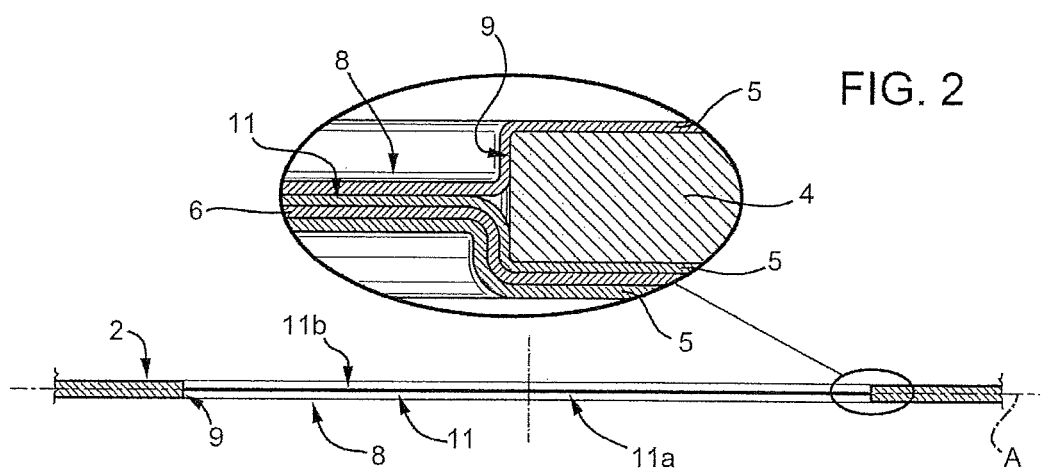
FIG. 2 shows a larger-scale section of the FIG. 1 sheet material before the opening device is applied.
Figure 10:
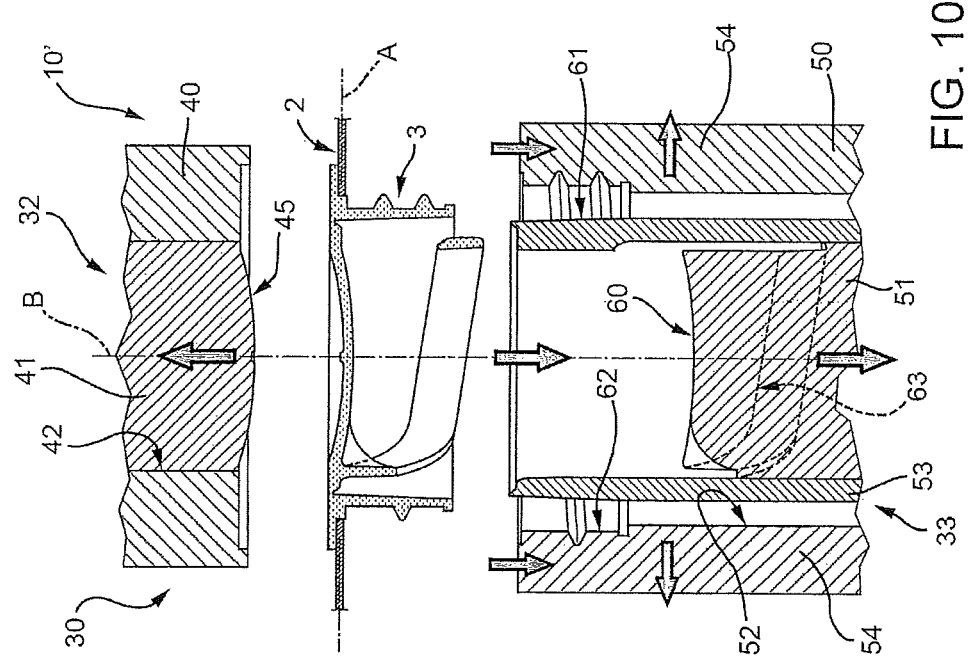
Figure 9:
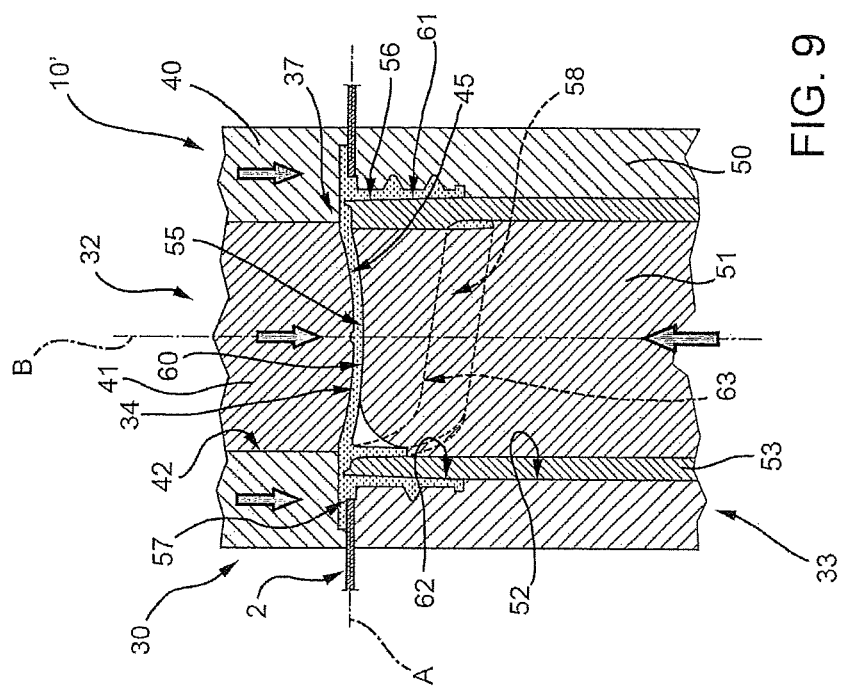
Figure 14:
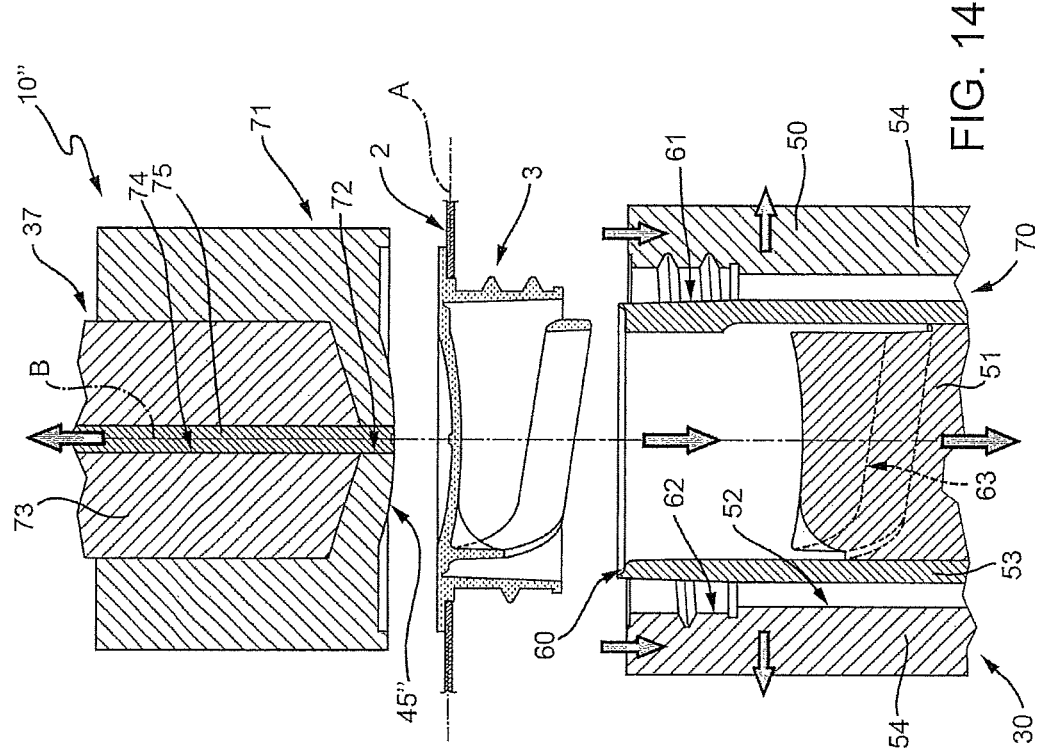
Figure 13:
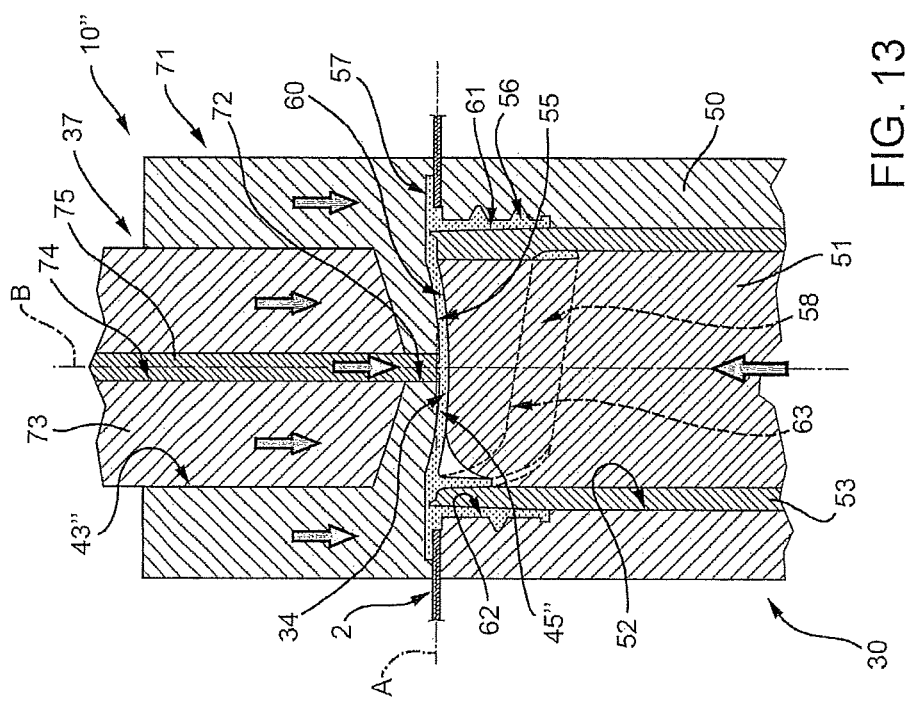

With particular reference to FIG. 2, packaging material 2 comprises a base layer 4 for stiffness and strength, which may be made of fibrous material, e.g. paper, or mineral-filled polypropylene material, and a plurality of layers 5 of heat-seal plastic material, e.g. polyethylene films, covering both sides of base layer 4.

In the case of an aseptic package 1 for long-storage products, such as UHT milk, packaging material 2 also comprises a layer 6 of gas-barrier material, e.g. aluminium foil or ethyl vinyl alcohol (EVOH) film, which is superimposed on a layer 5 of heat-seal plastic material, and is in turn covered with another layer 5 of heat-seal plastic material forming the inner face of package 1 eventually contacting the food product.

In other words, layers 5 and 6 define respective lamination layers applied to base layer 4 when producing packaging material 2 in the form of a continuous strip.

Packaging material 2 also comprises a number of receiving portions 8 (only one shown in the drawings) equally spaced in a lengthwise direction A of the packaging material, and to which opening devices 3 are subsequently molded by using forming apparatus 10.

In the example shown, each receiving portion 8 is defined by a so-called pre-laminated hole, i.e. a hole 9 formed through base layer 4 of packaging material 2 and covered by lamination layers 5, 6, so that hole 9 is sealed by a respective sheet cover portion 11.

In a possible alternative embodiment not shown, cover portion 11 may even be defined by only one or some of layers 5, 6. For example, cover portion 11 may be made solely of gas-barrier material.

In another possible alternative embodiment not shown, cover portion 11 may be defined by a patch fixed to the rest of packaging material 2 to seal a hole formed, in this case, through the full thickness of such packaging material 2.

In a further alternative embodiment not shown, each receiving portion 8 may be simply defined by a hole formed through the full thickness of the packaging material 2 and which is destined to be sealed by the relative opening device 3.

In the following description, reference is made to one receiving portion 8 and one opening device 3 for the sake of simplicity.

As shown in particular in FIG. 1, opening device 3 has an axis B, which is substantially perpendicular to cover portion 11. Opening device 3 substantially comprises a confetti portion 12 adhering to one side 11a of cover portion 11—in the example shown, the side eventually facing inwards of package 1—, and a cylindrical tubular pouring element 13, which is fixed to packaging material 2 about hole 9, defines an opening 16 by which to pour the food product from package 1, and extends through cover portion 11 as a follow-on from the piercing thereof so as to be arranged on both sides 11a, 11b of cover portion 11.

A cap 14 (FIG. 1) is fitted removably to pouring element 13 to outwardly close opening 16 even after removal of confetti portion 12 and cover portion 11.

More specifically, confetti portion 12 and pouring element 13 are molded in one piece and define opening device 3, whilst cap 14 is formed separately from the opening device 3 and then applied thereto.

Confetti portion 12 and cover portion 11 of hole 9 together define a sealing portion 15 sealing opening 16 of pouring element 13.

As shown particularly in FIG. 1, pouring element comprises an annular flange portion 17, fixed to packaging material 2 about hole 9, and a cylindrical tubular neck portion 18 projecting axially from an inner lateral edge of flange portion 17, and extending through a peripheral annular portion of cover portion 11. In other words, neck portion 18 projects from packaging material 2 on side 11b opposite the side 11a to which confetti portion 12 is fixed.

As shown in FIG. 1, confetti portion 12 and flange portion 17 are joined by an annular membrane connection portion 19, which is smaller in section than portions 12 and 17, so as to tear easily to detach sealing portion 15 from pouring element 13. In other words, annular membrane connection portion 19 defines a tear line along which to detach confetti portion 12 from pouring element 13.

On the side destined in use to face cap 14, confetti portion 12 may have an integral projecting pull ring 21, which is used by the user to detach sealing portion 15 from pouring element 13 along annular membrane connection portion 19 and so free opening 16 to pour out the product.

More specifically, pull ring 21 extends inside, and at a predetermined distance from, neck portion 18, and is joined to confetti portion 12 by a tab 22.

As shown in FIG. 1, cap 14 is of a screw type, and has a cylindrical lateral wall 23 with an inner thread 24, which engages a corresponding outer thread 25 on neck portion 18 of pouring element 13.

With reference to FIGS. 3 to 6, forming apparatus 10 basically comprises a molding unit 30 operating at a molding zone 31 of the forming apparatus 10 and having a first and a second mold 32, 33, which are coaxial with axis B of the opening device 3 being formed and are arranged on opposite sides of packaging material 2; first and second mold 32, 33 are selectively set in an open configuration (FIGS. 3 and 6), in which they are spaced along axis B from one another to allow feed of packaging material 2 therebetween, and in a closed configuration, in which they cooperate with opposite faces of packaging material 2 and delimit a closed mold cavity 34 housing receiving portion 8 of packaging material 2 and adapted to be filled with molten plastic material to define, when the plastic material sets, the opening device 3, i.e. the one-piece body comprising confetti portion 12 and pouring element 13.

Forming apparatus 10 advantageously further comprises feeding means 35 to feed a dose 36 of molten plastic material to molding zone 31 in the open configuration of first and second mold 32, 33, and pressing means 37 carried by molding unit 30 and exerting pressure on dose 36 to force it to fill mold cavity 34 and to form opening device 3.

In particular, feeding means 35 receive the dose 36 from a molten plastic material distributing unit, for example an extruder not shown, and delivers the dose 36 to the molding zone 31.

It is pointed out that the term "dose" is used in the present description and in the claims to indicate a pre-defined/measured amount of plastic material in a paste state, i.e. in a molten or semi-molten state, which is removed from the molten plastic material delivering unit.

It is also pointed out that molding zone 31 includes not only first and second mold 32 and 33 but the entire region where such first and second mold 32, 33 operate, including the space interposed between the first and second mold 32, 33 in the open configuration thereof.

In the preferred embodiment shown in FIGS. 3 to 6, dose 36 is directly fed by feeding means 35 to one of the first and second mold 32, 33, in particular to first mold 32.

In greater details, in the specific solution disclosed in FIGS. 3 to 6, first mold 32 faces side 11a of cover portion 11, whilst second mold 33 faces side 11b of the same.

First mold 32 comprises an outer annular element 40 and a core element 41, coupled to one another in a sliding manner along axis B; in particular, core element 41 engages a through opening 42 of annular element 40.

First mold 32 can be set in a first configuration (FIGS. 3 and 4), in which annular element 40 axially protrudes from core element 41 towards packaging material 2 and delimits, together with core element 41, a seat 43 open towards packaging material 2 for receiving dose 36 from feeding means 35, and a second configuration (FIGS. 5 and 6), in which core element engages the full axial height of opening 42 of annular element 40 and defines, through its head portion facing packaging material 2 and together with adjacent head portion of annular element 40, a forming surface 45 delimiting one side of mold cavity 34 in the closed configuration of first and second mold 32, 33.

In practice, seat 43 of first mold 32 defines part of mold cavity 34 in the closed configuration of first and second mold 32, 33.

Second mold 33 comprises an outer annular element 50, a core element 51 engaging a through opening 52 of outer annular element 50, and an intermediate annular element 53 also engaging opening 52 and radially interposed between outer annular element 50 and core element 51. Core element 51 and intermediate annular element 52 cooperate with one another in a sliding manner along axis B. Outer annular element 50 is made up of a plurality of components 54 which can be radially opened to allow disengagement of the opening device 3 from second mold 33.

With particular reference to FIG. 5, mold cavity 34 defines, when in operation:

a confetti-shaped chamber 55 of axis B, which receives cover portion 11 of receiving portion 8 and is adapted to define in use confetti-shaped portion 12 and annular flange portion 17 of opening device 3;

a tubular chamber 56 extending, coaxially with axis B, from one side of a flat annular peripheral portion 57 of chamber 55, and which is adapted to define in use neck portion 18 of opening device 3; and a shaped chamber 58 which defines pull ring 21 of confetti portion 12, and extends from the same side as chamber 56, and from a radially inner point of chamber 55 with respect to annular peripheral portion 57.

In particular, chamber 55 is delimited, on one side, by forming surface 45 of first mold 32 and, on the opposite side, by a forming surface 60 defined by head portion of second mold 33 facing packaging material 2; in greater details, forming surface 60 is defined by head portions of the various component elements of second mold 33, i.e. outer annular element 50, core element 51 and intermediate annular element 53.

Chamber 56 is delimited, on one side, by radially outer surface 61 of intermediate annular element 53 and, on the opposite side, by radially inner surface 62 of outer annular element 50.

Chamber 58 is instead entirely defined by an inner shaped surface 63 of core element 51.

In this specific embodiment, surfaces 45, 60, 61, and 63, bounding mold cavity 34, define pressing means 37, which are therefore carried by both first and second mold 32, 33.

With reference to FIG. 3, feeding means 35 comprise a feed device 65 having at least one delivery portion 66 adapted to be selectively positioned above seat 43 of first mold 32 in the open configuration of first and second mold 32, 33 to feed to the seat 43 one dose 36 for forming one opening device 3.

In practice, feed device 65 can be moved between a first position, in which it is interposed between first and second mold 32, 33 and feeds dose 36 to one of the first and second mold 32, 33, in the present case first mold 32, and a second position, in which it is moved away from first and second mold 32, 33.

In use, forming one opening device 3 on a relative receiving portion 8 of packaging material 2 is performed as follows, starting from an initial condition of forming apparatus 10, in which first and second mold 32, of molding unit 30 are in the open configuration (FIG. 3) and packaging material 2, lying flat on a horizontal plane, is fed in direction A through the space between the first and second mold 32, 33.

First, feed device 65 is displaced to the first position (FIG. 3), in which it has its delivery portion 66 placed above seat 43 of first mold 32 and releases one dose 36 to the seat 43.

After this operation, feed device 65 is moved away from the space between first and second mold 32, 33.

The next step consists in arranging one receiving portion 8 of packaging material 2 in a position facing both first and second mold 32, 33; this step can be performed by moving either packaging material 2 with respect to molding unit 30 or the molding unit 30 with respect to the packaging material 2; it is also clear that packaging material 2 and molding unit 30 may be both advanced along direction A, even if with different speeds in order to arrange one receiving portion 8 of the packaging material 2 in a position facing both first and second mold 32, 33.

At this point, first and second mold 32, 33 are displaced to the closed configuration (FIG. 5), in which they define closed mold cavity 34 in turn completely receiving the receiving portion 8.

It is clear that the closed configuration of molding unit 30 can be achieved not only by moving both first and second mold 32, 33 along axis B towards packaging material 2, as shown in FIGS. 3 to 6 relative to a preferred embodiment of the present invention, but even by moving only one of the first and second mold 32, 33 and by maintaining the other one in a fixed position contacting packaging material 2.

It should be noted that the part of packaging material 2 fed between first and second mold 32, 33 is transversal, preferably orthogonal, to axis B, along which one of, or both, first and second mold 32, 33 is/are moved.

During the movement from the open to the closed configuration, first and second mold 32, 33 exert a compressing action on the dose 36, which is forced to fill the entire mold cavity 34 and to form opening device 3.

In particular, a relative movement occurs between core element 41 and outer annular element 40 (illustrated by the arrow shown in FIG. 4) to reach second configuration of first mold 32 (shown in FIG. 5) and, in the meantime, dose 36 is compressed by forming surface 45 against side 11a of cover portion 11. In practice, the molten plastic material of dose 36 gradually flows along side 11a of cover portion 11 while closed mold cavity 34 is formed by first and second mold 32, 33 contacting packaging material 2 on both opposite sides. The molten plastic material fills the entire confetti-shaped chamber 55 from a central portion thereof towards annular peripheral portion 57.

The pressing action on the molten plastic material contained in confetti-shaped chamber 55 pushes cover portion 11 of packaging material 2 against mold second 33, so that side 11b of cover portion 11 contacts forming surface 60.

At this stage, layer 5 of heat-seal plastic material of cover portion 11, facing first mold 32, melts with the plastic material into mold cavity 34.

The molten plastic material spreads radially inside confetti-shaped chamber 55 until it eventually reaches the intersection of this chamber 55 with shaped chamber 58, where cover portion 11, having no solid support by second mold 33, is pierced neatly by the pressure of the molten plastic material; at this point, molten plastic material fills the whole of shaped chamber 58.

In exactly the same way, when the molten plastic material reaches the annular portion at the intersection of confetti-shaped chamber 55 and tubular chamber 56, cover portion 11 is pierced by the pressure of the molten plastic material, which therefore flows into the whole of tubular chamber 56 to form neck portion 18 of pouring element 13 and thread 25.

In other words, the molten plastic material of dose 36 pierces through cover portion 11 at the intersections between confetti-shaped chamber 55 and tubular and shaped chambers 56 and 58 of mold cavity 34 to form through openings, which are subsequently sealed off by the plastic material to fully restore the integrity of packaging material 2.

Once the plastic material filling the whole of mold cavity 34 sets, components 54 of outer annular element 50 of second mold 33 radially open and first and second mold 32 and 33 are moved to the open configuration (shown in FIG. 6) so as to allow extraction of opening device 3 from molding unit 30 and insert of another receiving portion 8, on which to perform another forming operation.

Number 10' in FIGS. 7 to 10 indicates as a whole a different embodiment of a forming apparatus in accordance with the present invention for forming opening devices 3 on packaging material 2; forming apparatus 10 and 10' being similar to one another, the following description is limited to the differences between them, and using the same references, where possible, for identical or corresponding parts.

Forming apparatus 10' differs from forming apparatus 10 in that feed device 65 is configured to selectively feed a dose 36 of molten plastic material directly onto a relative receiving portion 8 of packaging material 2, in turn advanced along direction A through molding zone 31 and between first and second mold 32 and 33.

In particular, in the example shown in FIGS. 7 to 10, dose 36 is fed onto side 11a of cover portion 11 of receiving portion 8, i.e. onto the upper side of packaging material 2 lying on a horizontal plane, which, in the example shown, will define the side eventually facing inwards of the packages formed from such material. The first mold 32 used in this case can be the same as the one used in forming apparatus 10, except that the packaging material 2 is shown turned upside down with respect to the packaging material in FIGS. 3 to 6.

The method for forming opening devices 3 on relative receiving portions 8 of packaging material 2 can be the same as the one described with reference to forming apparatus 10, except that doses 36 are directly fed onto packaging material 2 and not to one of the first and second mold 32, 33.

Once feed device 65 has delivered one dose 36 to a relative receiving portion 8 of packaging material 2, such dose 36 sticks to the receiving portion 8 itself so keeping the same position in which it was fed; in other words, by being formed by a paste plastic material, i.e. a molten or semi-molten plastic material, doses 36 are sticky and therefore adheres to the respective receiving portions 8 of packaging material 2.

Number 10" in FIGS. 11 to 14 indicates as a whole a different embodiment of a forming apparatus in accordance with the present invention for forming opening devices 3 on packaging material 2; forming apparatus 10 and 10" being similar to one another, the following description is limited to the differences between them, and using the same references, where possible, for identical or corresponding parts.

Forming apparatus 10" differs from forming apparatus 10 in that molding unit 30 comprises a first mold 71 facing in use side 11a of cover portion 11 of the relative receiving portion 8, bounded towards packaging material 2 by a forming surface 45" identical to forming surface 45 of first mold 32 and defining, on its side opposite the one facing packaging material 2, an open seat 43" for receiving a dose 36 of molten plastic material from feed device 36; forming apparatus 10" also comprises a second mold 70, having the same structure as second mold 33 and facing in use side 11b of cover portion 11 of a relative receiving portion 8.

It should be noted that packaging material 2 in FIGS. 11 to 14 is shown as turned upside down with respect to the packaging material in FIGS. 3 to 6.

Analogously to first and second mold 32, 33 of forming apparatus 10, first and second mold 71, 70 are selectively set in an open configuration (FIGS. 11, 12 and 14), in which they are spaced from one another and allow feed of packaging material 2 therebetween, and in a closed configuration (FIG. 13), in which they cooperate with opposite faces of packaging material 2 and define a closed mold cavity 34 adapted to house a relative receiving portion 8 of packaging material 2 on which one opening device 3 is to be formed.

In this case, feed device 65 is configured to selectively feed a dose 36 of molten plastic material in seat 43" of first mold 71, when first and second mold 71, 70 are in the open configuration (FIG. 11).

Seat 43" is connected in use to mold cavity 34 through an axial channel 72 extending from a bottom wall of the seat 43" to forming surface 45".

First mold 71 further comprises a plunger 73 slidably engaging seat 43" to press in use dose 36 placed in said seat 43" to force the molten plastic material to flow into mold cavity 34.

In particular, plunger 73 is displaceable along axis B between an extracted position, in which it is detached from the open side of seat 43" in order to allow feeding of a dose 36 into the seat 43", and a final pressing position, in which it fully engages seat 43" and forces the molten plastic material forming dose 36 to flow through channel 72 into mold cavity 34.

Displacement of plunger 73 from the extracted position to the final pressing position is activated as first and second mold 71, 70 are in their closed configuration.

Plunger 73 has a through axial hole 74 having the same diameter as channel 72, coaxial with the latter and engaged, in a sliding manner, by a rod 75 to allow molten plastic material to fully flow out of first mold 71.

In this case, plunger 73 and rod 75 define pressing means 37 together with the surfaces 45", 60, 61, 62 and 63 delimiting mold cavity 34.

The method for forming opening devices 3 on relative receiving portions 8 of packaging material 2 by using forming apparatus 10" is similar to the one described with reference to forming apparatus 10, except that the dose 36 is pressed by plunger 73 and rod 75 to fill mold cavity 34, after setting first and second mold 71, 70 in the closed configuration; in other words, the molten plastic material of the dose 36 is not pressed by first and second mold 71, 70, while these molds are moving to the closed configuration, but the pressing action is performed by plunger 73 and rod 75 after the first and second mold 71, 70 have reached the closed configuration.

The advantages of the forming apparatus 10, 10', 10" and the forming method according to the present invention will be clear from the foregoing description.

In particular, the fact that the step of feeding the dose 36 of molten plastic material to form one opening device 3 is performed in the open configuration of first and second mold 32, 33, 71, 70 allows this step to be well separated from the step of compressing the molten plastic material into the mold cavity 34. In this way, it is possible to achieve a better control and quality of these two steps than in the case of injection molding, wherein feeding of the dose to form one opening device and molding of the opening device are made in the same process. In this latter case, it is difficult to determine whether a possible problem occurring during the operation of injection molding is caused by the feeding of the plastic material or by the proper molding step.

In addition, performing the feeding of the plastic material separately from the molding step permits to position the relative devices (feed device 65 and molding unit 30) in a more flexible way along the path of the packaging material 2 than in known injection molding apparatus.

This is particularly evident when the dose 36 is directly fed onto the packaging material 2; in this case, the feeding step can be performed in any position along the path of the packaging material 2, even in a position far from the molding unit 30.

The separation of the feeding step from the molding step allows to move molding unit 30 along the path of the packaging material 2; in this case, the dose 36 may be received by the molding unit 30 in a position spaced from the one in which the molding operation is performed. In other words, it would be not necessary to move also the feed device 65, and in particular the molten plastic material delivering unit, i.e. the extruder, along the path of the packaging material 2 together with molding unit 30.

Moreover, performing the molding operation by compressing the dose 36 of molten plastic material requires less force than injecting the same material through a hole in the molds and therefore less power and less costs.

Clearly, changes may be made to forming apparatus 10, 10', 10" and the forming method as described herein without, however, departing from the scope as defined in the accompanying Claims.

In particular, the molding operations described may be also applied on receiving portions 8 of any outer profile, i.e. even not circular, to produce opening devices having tubular pouring elements with non-circular cross-sections, e.g. oval, elliptical or simply defined by closed-loop profiles.

The invention claimed is:

1. A method for forming a plurality of opening devices on each one of a plurality of receiving portions provided on sheet packaging material for packaging pourable food products, each of the receiving portions receiving a respective opening device of the opening devices, the receiving portions being equally spaced apart from one another in a longitudinal direction of the sheet packaging material itself; said method being carried out by an apparatus comprising a molding unit operating at a molding zone of the apparatus; said method comprising:

arranging a first mold and a second mold of said molding unit in an open configuration, in which the first and second molds are spaced apart from one another to allow feed of said sheet packaging material linearly between the first and second molds in the longitudinal direction;

setting said first and second molds in a closed configuration, in which the first and second molds cooperate with opposite faces of said sheet packaging material and delimit a closed mold cavity housing one of said receiving portions of said sheet packaging material;

feeding a dose of molten plastic material onto one of said receiving portions of said sheet packaging material, said first and second molds being in said open configuration during said feeding of said dose of molten plastic material;

linearly conveying said sheet packaging material with said dose of molten plastic on said receiving portion of said sheet packaging material in said longitudinal direction until said dose of molten plastic becomes positioned between said first and second molds, said first and second molds remaining in said open configuration during the linear conveying of said sheet packaging material;

pressing said dose to force the dose to fill said mold cavity by moving said first and second molds relative to one another to the closed configuration; and compression-molding the respective opening device of the opening devices on said receiving portion of said sheet packaging material while conveying said first and second molds linearly in said longitudinal direction.

2. The method as claimed in claim 1, wherein said pressing is performed by respective surfaces of said first and second molds delimiting said mold cavity.

3. A method comprising:

conveying sheet packaging material linearly in a conveying direction, the sheet packaging material comprising multiple layers, at least one of the multiple layers comprising a through-hole, and at least one of the multiple layers being a lamination layer that extends over the through-hole;

positioning a first mold and a second mold in spaced apart relation to one another to allow the sheet packaging material to be linearly conveyed between the first and second molds in the conveying direction, the first and second molds being at the same position in the conveying direction and being spaced apart from one another in a direction transverse to the conveying direction;

feeding a dose of molten plastic material onto the lamination layer of the sheet packaging material extending over the through-hole of the sheet packaging material;

conveying the sheet packaging material with the dose of molten plastic material on the sheet packaging material in the conveying direction, the sheet packaging material being linearly conveyed between the first and second molds while the first and second molds are in spaced apart relation to one another;

closing the first and second molds by moving the first and second molds relative to one another in the transverse direction when the dose of molten plastic material on the sheet packaging material is at the same position as the first and second molds in the conveying direction so that the first and second molds cooperate with opposite surfaces of the sheet packaging material to delimit a closed mold cavity around the through-hole of the at least one multiple layer of the sheet packaging material with the molten dose of plastic material being on the lamination layer within the closed mold cavity; and forming an opening device on the through-hole of the at least one multiple layer of the sheet packaging material while the sheet packaging material and the first and second molds all continue to be linearly conveyed.

4. The method according to claim 3, wherein the through-hole is in a base layer of the sheet packaging material.

\* \* \* \* \*